(12) United States Patent
Tono

(10) Patent No.: US 8,166,105 B2
(45) Date of Patent: Apr. 24, 2012

(54) PORTABLE TERMINAL, SERVER, AND METHOD FOR REALIZING FUNCTION OF PORTABLE TERMINAL USING NETWORK

(75) Inventor: Kosuke Tono, Tokyo (JP)

(73) Assignee: NEC Corporation, Tokyo (JP)

( * ) Notice: Subject to any disclaimer, the term of this patent is extended or adjusted under 35 U.S.C. 154(b) by 417 days.

(21) Appl. No.: 12/445,998

(22) PCT Filed: Oct. 19, 2007

(86) PCT No.: PCT/JP2007/070478
§ 371 (c)(1),
(2), (4) Date: Apr. 17, 2009

(87) PCT Pub. No.: WO2008/047919
PCT Pub. Date: Apr. 24, 2008

(65) Prior Publication Data
US 2010/0325328 A1    Dec. 23, 2010

(30) Foreign Application Priority Data
Oct. 20, 2006   (JP) .................................. 2006-286552

(51) Int. Cl.
G06F 15/16   (2006.01)
(52) U.S. Cl. .......................... 709/203; 709/227; 709/236
(58) Field of Classification Search .................... 709/203
See application file for complete search history.

(56) References Cited

U.S. PATENT DOCUMENTS

| | | | | |
|---|---|---|---|---|
| 6,701,368 | B1 * | 3/2004 | Chennapragada et al. | ... 709/228 |
| 7,685,253 | B1 * | 3/2010 | Valia | 709/217 |
| 7,685,257 | B2 * | 3/2010 | King et al. | 709/219 |
| 7,925,771 | B1 * | 4/2011 | Ping et al. | 709/231 |
| 2002/0032751 | A1 * | 3/2002 | Bharadwaj | 709/218 |
| 2004/0054757 | A1 * | 3/2004 | Ueda et al. | 709/219 |
| 2004/0239986 | A1 * | 12/2004 | Wise | 358/1.15 |
| 2008/0126649 | A1 * | 5/2008 | George | 710/260 |

FOREIGN PATENT DOCUMENTS

| | | |
|---|---|---|
| JP | 1999175468 A | 7/1999 |
| JP | 2001331435 A | 11/2001 |
| JP | 2003058439 A | 2/2003 |
| JP | 2004078849 A | 3/2004 |
| JP | 2007102308 A | 4/2007 |
| WO | 0246905 A | 6/2002 |

OTHER PUBLICATIONS

International Search Report for PCT/JP2007/070478 mailed Nov. 20, 2007.

* cited by examiner

*Primary Examiner* — Christopher Biagini

(57) ABSTRACT

A portable terminal, capable of accessing to software executing server having a hardware access layer in which the hardware of a predetermined portable terminal is virtualized, wherein the server executes a virtual portable terminal program realizing a predetermined function of a portable terminal in response to a request from the portable terminal. The portable terminal comprises: a terminal-end hardware access layer that receives a hardware access instruction issued by a virtual portable terminal program executed by the software executing server to the hardware access layer in a hardware access command capable of containing a plurality of hardware access instructions.

11 Claims, 17 Drawing Sheets

PORTABLE TERMINAL, SERVER, AND METHOD FOR REALIZING FUNCTION OF PORTABLE TERMINAL USING NETWORK

This application is the National Phase of PCT/JP2007/070478, filed Oct. 19, 2007, which claims priority to Japanese Patent Application No. 2006-286552, filed on Oct. 20, 2006, which is incorporated herein by reference in its entirety.

TECHNICAL FIELD

The present invention relates to a method for realizing function of portable (mobile) terminal, system implementing the method, portable terminal, server, and various devices; and particularly to a method for realizing a function of a portable terminal using the resources of a server on a mobile network, system implementing the method, portable terminal, server, and various devices.

BACKGROUND ART

In recent years, portable terminals such as mobile phone terminals and PDAs (Personal Digital Assistant) are able to download applications from a server, in addition to preinstalled applications. Further, as the speed of radio networks increases and the functions of portable terminals are improved and diversified, users are demanding an increasing number of more advanced functions.

Patent Document 1 discloses a remote controlled printing system in which a server on a communication network vicariously performs high-load processing (print object data conversion processing) and a portable terminal receives only processing results.

Further, Patent Document 2 disclose a technology called nomadic computing in which virtual application environment control units and virtual input/output control units of two computers are virtually connected and the user environment of one of the computers is realized by the other computer.

[Patent Document 1] WO2002/046905
[Patent Document 2] Japanese Patent Kokai Publication No. JP-A-11-175468

SUMMARY

The entire disclosures in the above-mentioned Patent Documents 1 and 2 are incorporated herein by reference thereto. The following analysis is given by the present invention.

In order to meet the aforementioned demand by users that an increasing number of more advanced functions be provided, in recently released new terminals, the functions of installed applications are improved and the processing ability of the CPU and memory are enhanced. However, since the improvement in the functions of applications and the enhancement of the CPU and memory generally increase the cost, size, and power consumption of a device, it is increasingly getting difficult to reduce the cost, size, and power consumption on the whole. Further, the functional improvement will increase the size of an application, and as a result, not only development costs, but also expenses and labor for bug fixes and such will increase as well.

According to the method disclosed in Patent Document 1, it is possible to obtain a high-load processing result using few resources, however, the method can only be effective when a particular processing is performed. Further, the processing ability and memory resources of a portable terminal cannot be decreased and the method does not contribute to the reduction of the cost, size, and power consumption of the portable terminal itself.

Further, according to the technology disclosed in Patent Document 2, it is possible to create a user environment suitable for the ability (including the applications) of each individual portable terminal, however, when this technology is applied to portable terminals, fluctuations in the transmission speed and communication quality in a wireless (radio) section that connects the portable terminals may cause delays. As a result, the operation of the portable terminal may delay or freeze, or the entire operation may become unnatural. Therefore, the user demand for advanced functions cannot be satisfied.

The present invention seeks to solve the problems described above, and it is an object of the present invention to provide a method for realizing a function of a portable (mobile) terminal, capable of enriching functions without increasing the processing ability and memory resources of the portable terminal and of reducing cost, size, and power consumption, portable terminal, server, client-server system, and various devices, which will be controlled objects, comprising a function that realizes (adds) a new function by the same method.

According to a first aspect of the present invention, there is provided a portable (mobile) terminal, capable of accessing to a software executing server having a hardware access layer in which the hardware of a predetermined portable terminal is virtualized, wherein the server executes a virtual portable terminal program realizing a predetermined function of a portable terminal in response to a request from the portable terminal. The portable terminal comprises: a terminal-end hardware access layer that receives a hardware access instruction issued by a virtual portable terminal program executed by the software executing server to the hardware access layer in a hardware access command capable of containing a plurality of hardware access instructions.

According to a second aspect of the present invention, there is provided a software executing server, having a hardware access layer in which the hardware of a predetermined portable terminal is virtualized, wherein the server executes a virtual portable terminal program realizing a predetermined function of a portable terminal in response to a request from the portable terminal; wherein the server executes the virtual portable terminal program in response to a request from a portable terminal comprising a terminal-end hardware access layer that receives a hardware access command containing a plurality of hardware access instructions; and the server transmits a hardware access instruction, issued by the virtual portable terminal program for the hardware access layer, as the hardware access command to the terminal-end hardware access layer of the portable terminal.

According to a third aspect of the present invention, there is provided a client-server system formed of the portable terminal and the software executing server described above, and an attachment device and a network device (external device) controlled by the portable terminal and the software executing server described above.

According to a fourth aspect of the present invention, there is provided a method for realizing a function of a portable terminal in a portable terminal capable of accessing to a software executing server, having a hardware access layer in which the hardware of a predetermined portable terminal is virtualized, wherein the portable terminal executes a virtual portable terminal program realizing a predetermined function of a portable terminal in response to a request from the portable terminal. The method for realizing (adding) a function of a portable terminal comprises: having the portable terminal access to the software executing server and request starting of a virtual portable terminal program realizing a desired function; having the virtual portable terminal program executed by the software executing server issue a hardware access instruction to the hardware access layer after the software executing server has started the virtual portable terminal program requested by the portable terminal; having the software executing server transmit the hardware access instruction as a hardware access command capable of containing a plurality of hardware access instructions to the portable terminal; and having the portable terminal operate hardware according to a hardware access instruction contained in the hardware access command.

According to the present invention, it becomes possible to realize many advanced functions demanded by users with a low-cost portable terminal having a reduced amount of memory installed and reduced processing ability without increasing cost, size, and power consumption. Further, in terms of application development, it becomes possible to reduce the cost and labor of developing applications. The reason is that, in order to improve functions of a portable terminal, any function can be provided from an external software executing server, which is not as limited as the portable terminal in terms of processing ability and memory resources, and that a hardware access method not susceptible to delays is employed.

PREFERRED MODES FOR CARRYING OUT THE INVENTION

Various modes of the present invention will be described.

Mode 1

According to a first aspect of the present invention, there is provided a portable terminal capable of accessing to a software executing server, having a hardware access layer in which the hardware of a predetermined portable terminal is virtualized; the portable terminal executing a virtual portable terminal program realizing a predetermined function of the portable terminal in response to a request from the portable terminal; and comprising a terminal-end hardware access layer that receives a hardware access instruction issued by the virtual portable terminal program executed by the software executing server to the hardware access layer in a hardware access command capable of containing a plurality of the hardware access instructions.

Mode 2

The hardware access command is further capable of containing a hardware access interval that prescribes the execution interval of the hardware access instructions and interrupt hook information that prescribes which hardware access instruction should be called up when an interrupt occurs.

Mode 3

The portable terminal starts an substitute program on the portable terminal when it cannot access to the software executing server, and as soon as the access to the software executing server has been restored, the portable terminal ends the substitute program on the portable terminal and requests the software executing server to start the virtual portable terminal program.

Mode 4

The portable terminal comprises: means for notifying the software executing server of an attachment device connected to the portable terminal and for having the hardware access layer of the software executing server updated, receives a hardware access command for the attachment device via the updated hardware access layer, and controls the attachment device.

Mode 5

The portable terminal is capable of controlling an external device connected to the software executing server by having a hardware access instruction for the external device issued via a virtual portable terminal program executed on the software executing server.

Other Modes

Further, it is possible to develop the software executing server, a client-server system, and a method for realizing a function of a portable terminal relating to the present invention similarly to each mode of the portable terminal described above.

Figure 1:
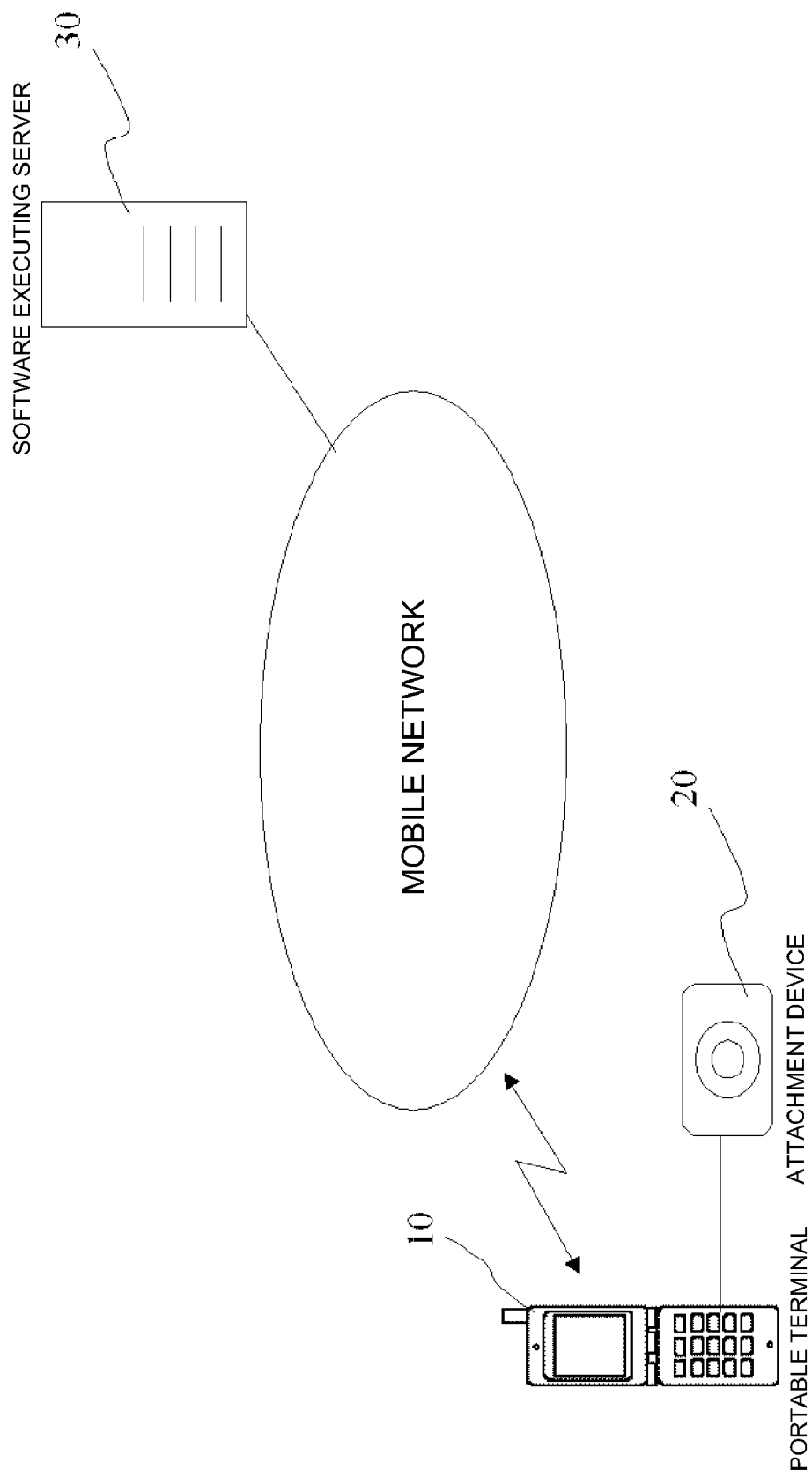
FIG. 1 is a drawing showing a schematic configuration according to a first mode of the present invention.

Next, a preferred mode for carrying out the present invention will be described in detail with reference to the drawings. FIG. 1 is a drawing showing a schematic configuration of the preferred mode of the present invention. FIG. 1 shows a portable terminal 10 having access means to a mobile network, an attachment device 20 that can be connected to the portable terminal 10, a mobile network, and a software executing server 30 connected to the mobile network.

Figure 2:
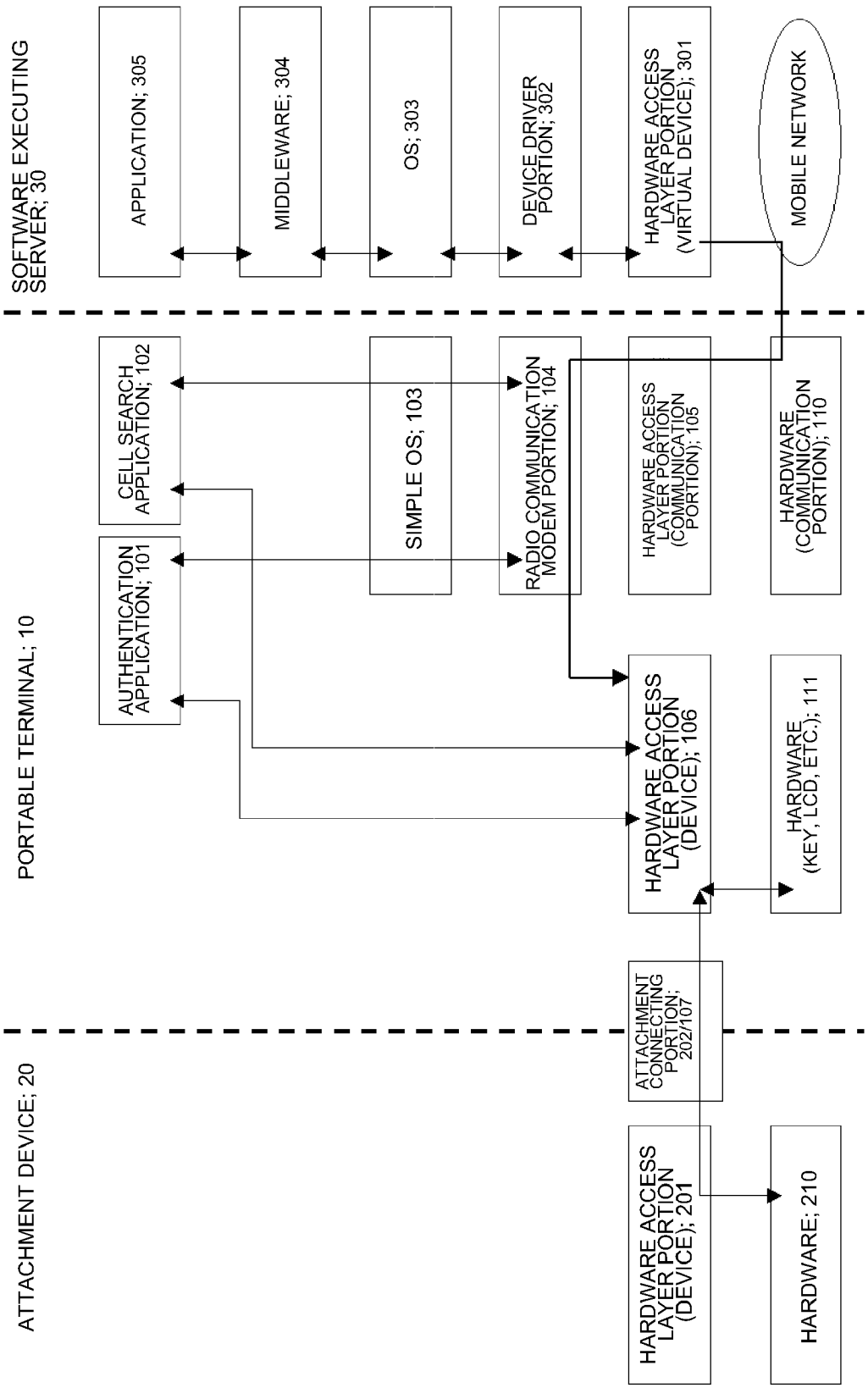
FIG. 2 is a drawing showing an attachment device, a portable terminal, and a software executing server according to the first mode of the present invention in a hierarchical model.

FIG. 2 is a drawing showing the attachment device 20, the portable terminal 10, and the software executing server 30 in a hierarchical model. In FIG. 2, the attachment device 20 is constituted by hardware 210 and a hardware access layer portion 201 that accesses to the hardware 210.

The portable terminal 10 is constituted by applications for wireless (radio) communication control such as an authentication application 101 and a cell search application 102, a simple operating system (OS) 103, a radio communication modem portion 104, and hardware access layer portions (device and communication portion) 105 and 106 for accessing to hardware (communication portion, key, LCD (Liquid Crystal Display), etc.) 110 and 111.

The software executing server 30 comprises an application 305 for realizing a virtual portable terminal, middleware 304, an OS 303 for the portable terminal, a device driver portion 302, and a hardware access layer portion 301 in which the hardware of the portable terminal 10 is virtualized.

Therefore, the portable terminal 10 does not have any application, middleware, OS, or device driver, and uses what is provided in the software executing server 30.

When a hardware access from the high-order elements of the software executing server 30, namely the application 305, the middleware 304, and the OS 303, occurs, the device driver portion 302 issues a hardware access instruction to the hardware access layer portion 301. The hardware access layer portion 301 puts together a plurality of the hardware access instructions received from the device driver portion 302 and constructs a hardware access command.

The hardware access layer portion 301 of the software executing server 30 and the hardware access layer portion 105 of the portable terminal 10 communicate via the mobile network using a hardware access protocol, and transmit and receive the constructed hardware access command.

The hardware access layer portion 105 of the portable terminal 10 analyzes the hardware access command received from the hardware access layer portion 301 of the software executing server 30 via the radio communication modem portion 104, extracts the hardware access instructions, and successively performs hardware accesses.

Further, when the hardware access layer portion 301 of the software executing server 30 transmits a hardware access command for the attachment device 20 connected to the portable terminal 10, the hardware access layer portion 105 of the portable terminal 10 transfers the hardware access command to the hardware access layer portion 201 of the attachment device 20 connected to the portable terminal 10.

The hardware access layer portion 201 of the attachment device 20 analyzes the hardware access command received, constructs hardware access instructions, and successively performs hardware accesses.

As described, by executing the virtual portable terminal programs of applications, middleware, OS, and device drivers of the portable terminal on the software executing server 30, it becomes possible to control the device (hardware) of the portable terminal 10 and the attachment device connected to the portable terminal 10.

EXEMPLARY EMBODIMENT 1

Next, in order to more concretely explain the preferred mode of the present invention, exemplary embodiments of the present invention will be described in detail with reference to the drawings.

Figure 3:
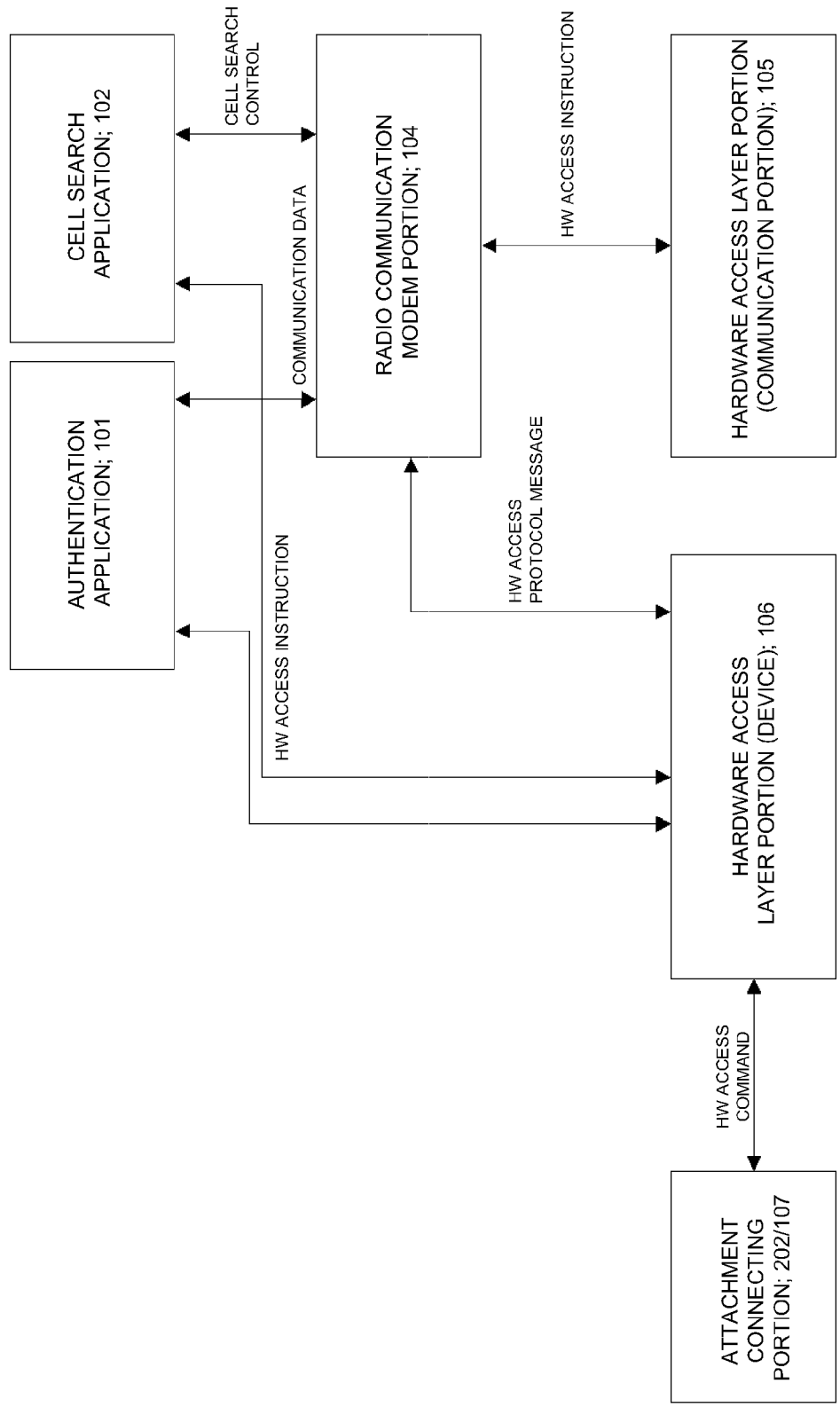
FIG. 3 is a block diagram showing the software structure of a portable terminal according to a first exemplary embodiment of the present exemplary embodiment.

FIG. 3 is a block diagram showing the software structure of the portable terminal 10 relating to the present exemplary embodiment. In FIG. 3, the applications for radio communication control such as the authentication application 101 and the cell search application 102 are connected to the radio communication modem portion 104 and the hardware access layer portion (device) 106 so that the hardware access instructions and communication data can be transmitted/received.

The authentication application 101 performs authentication processing with the software executing server 30.

The cell search application 102 searches a cell in which radio communication is possible when no radio communication connection is established.

The radio communication modem portion 104 has a function of processing a communication protocol between the portable terminal and the mobile network. Further, the radio communication modem portion 104 controls the radio communication hardware (110 in FIG. 2) via the hardware access layer portion (communication portion) 105.

The hardware access layer portion (communication portion) 105 provides the high-order blocks with access means to the radio communication hardware (110 in FIG. 2).

The hardware access layer portion (device) 106 provides high-order blocks with access means to the hardware of the portable terminal not pertaining to radio communication, such as the keys and the LCD. Further, the hardware access layer portion (device) 106 has functions of communicating with the hardware access layer portion (virtual device) 301 of the software executing server 30 using a hardware access protocol and of performing processing of the hardware access command.

The attachment connecting portion 107 has a function of transmitting/receiving the hardware access command to/from the attachment device 20.

Figure 4:
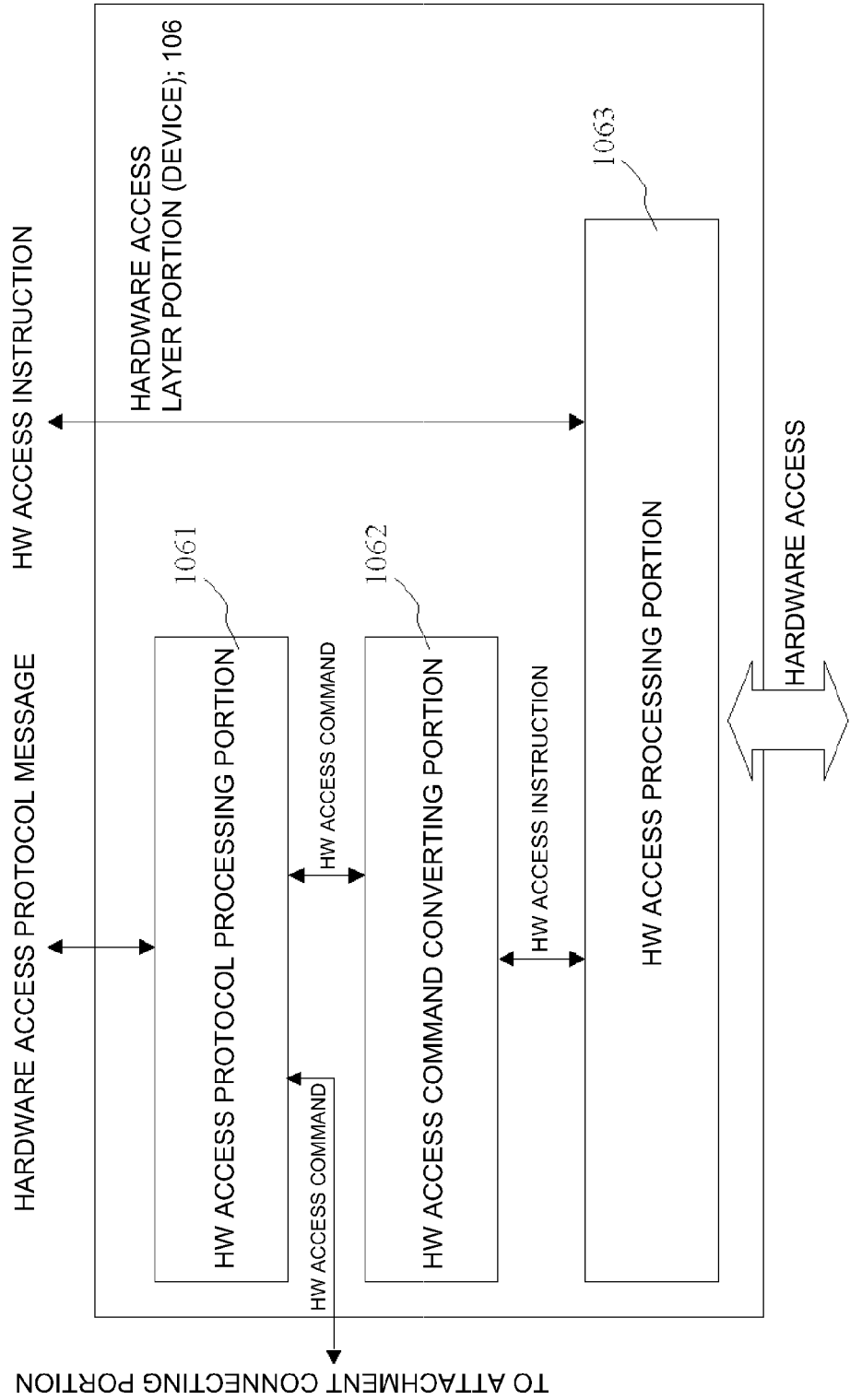
FIG. 4 is a block diagram showing a detailed configuration of a hardware access layer portion (device) of the portable terminal according to the first exemplary embodiment of the present invention.

FIG. 4 is a block diagram showing a detailed configuration of the hardware access layer portion (device) 106 of the portable terminal 10. In FIG. 4, the hardware access layer portion (device) 106 of the portable terminal 10 is constituted by a HW (hardware) access protocol processing portion 1061 that communicates with the hardware access layer portion (virtual device) 301 of the software executing server 30 using a hardware access protocol, a HW access command converting portion 1062, and a hardware access processing portion 1063 that controls each piece of hardware.

The HW access protocol processing portion 1061 is connected to the HW access command converting portion 1062 and transmits the hardware access command included in a hardware access protocol message.

The HW access command converting portion 1062 has functions of analyzing the hardware access command received from the HW access protocol processing portion 1061 and of constructing hardware access instructions.

The hardware access processing portion 1063 has a function of performing hardware access based on the hardware access instructions received from the HW access command converting portion 1062.

Figure 5:
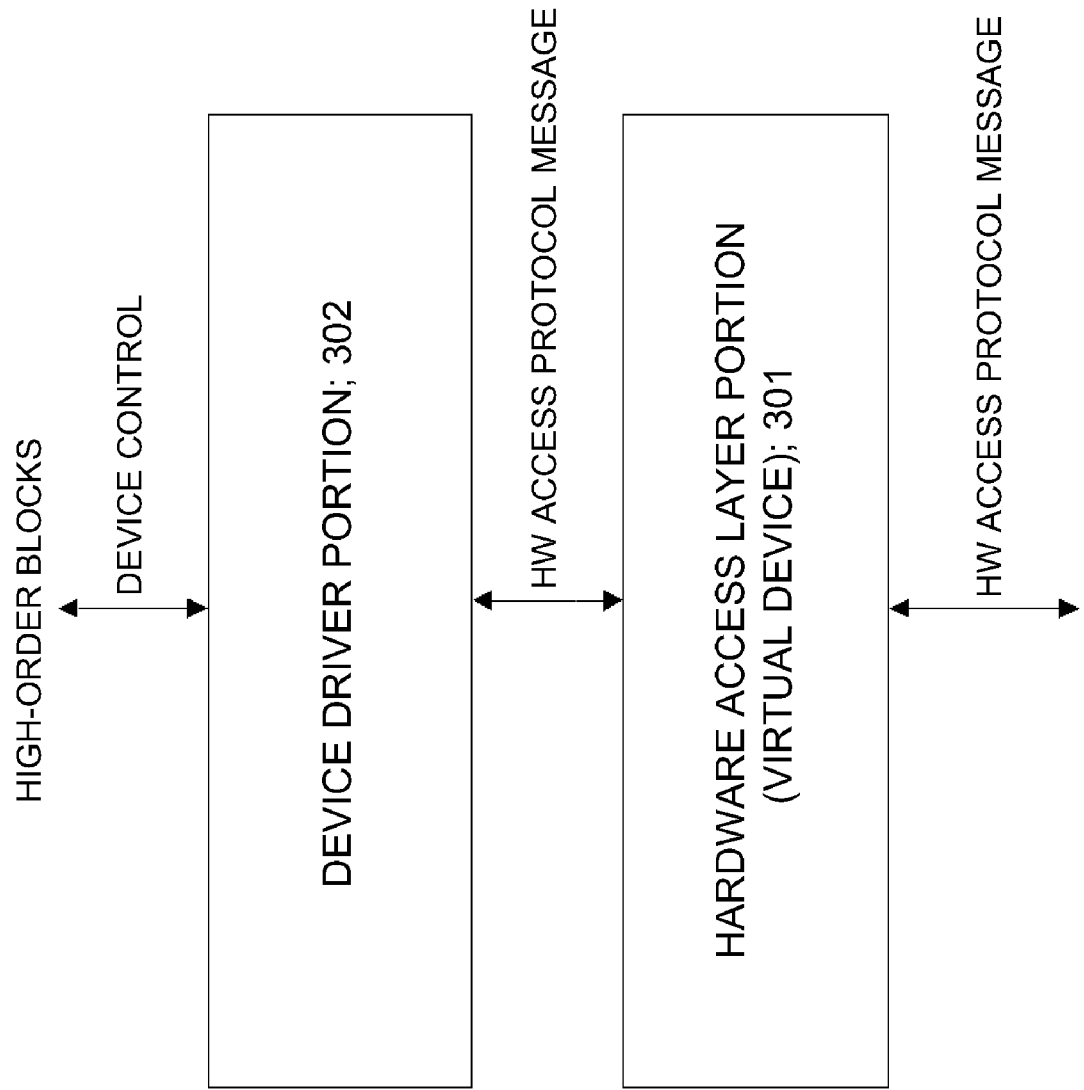
FIG. 5 is a block diagram showing the software structure of a software executing server according to the first exemplary embodiment of the present invention.

FIG. 5 is a block diagram showing the software structure (low-order blocks) of the software executing server 30. In FIG. 5, the hardware access layer portion (virtual device) 301 functions as access means to the hardware for the device driver portion 302; the hardware access layer portion (virtual device) 301 constructs a hardware access command from the hardware access instructions received from the device driver portion 302 and transmits the result in the form of the hardware access protocol message, described later. The device driver portion 302 controls the devices on behalf of the high-order blocks: the application, the middleware, and the OS.

Figure 6:
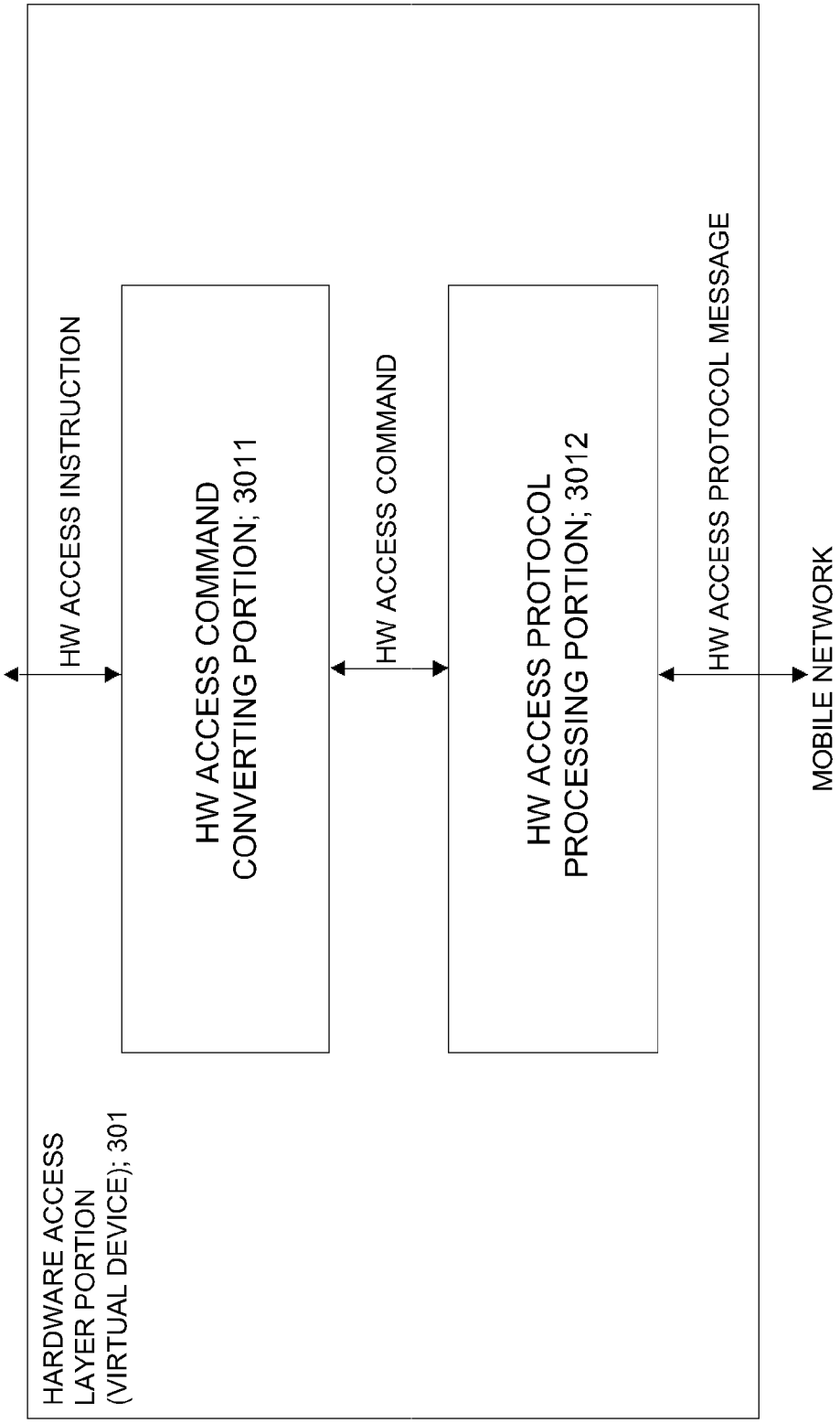
FIG. 6 is a block diagram showing a detailed configuration of a hardware access layer portion (virtual device) of the software executing server according to the first exemplary embodiment of the present invention.

FIG. 6 is a block diagram showing a detailed configuration of the hardware access layer portion (virtual device) 301 of the software executing server 30. In FIG. 6, the hardware access layer portion (virtual device) 301 of the software executing server 30 is constituted by an HW access command converting portion 3011 that receives the hardware access instructions from the device driver portion 302, and an HW access protocol processing portion 3012 that communicates with the hardware access layer portion (device) 106 of the portable terminal 10.

The HW access command converting portion 3011 constructs a hardware access command from the hardware access instructions and transmits it to the HW access protocol processing portion 3012.

The HW access protocol processing portion 3012 communicates with the hardware access layer portion (device) 106 of the portable terminal 10 using a hardware access protocol.

Figure 7:
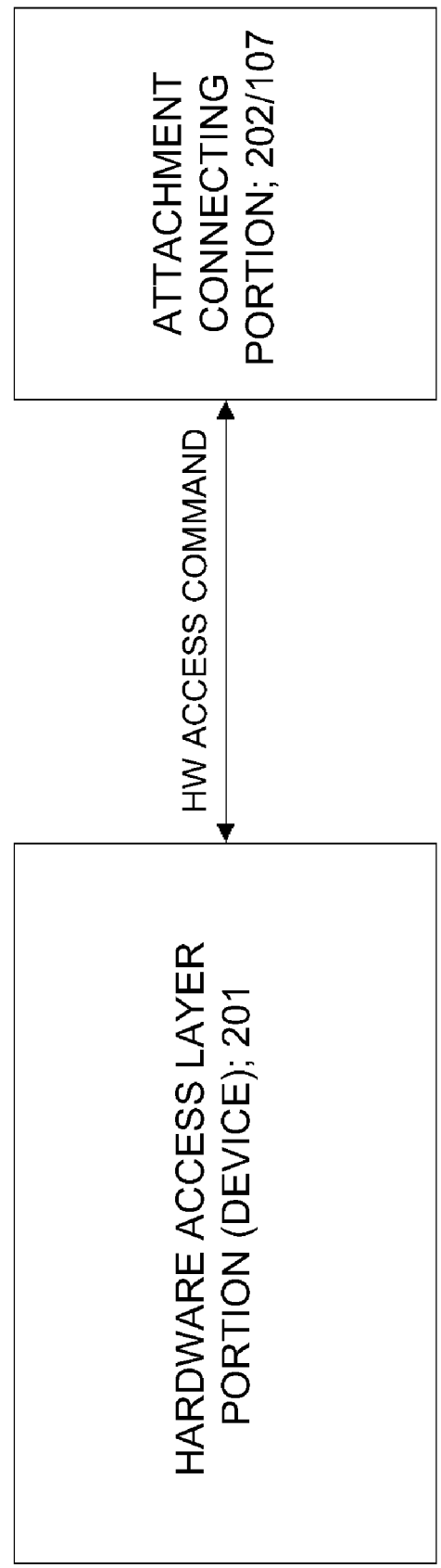
FIG. 7 is a block diagram showing the software structure of an attachment device according to the first exemplary embodiment of the present invention.

FIG. 7 is a block diagram showing the software structure of the attachment device 20. In FIG. 7, the hardware access layer portion (device) 201 of the attachment device 20 is connected to an attachment connecting portion 202 and receives the hardware access command sent from the portable terminal 10.

Figure 8:
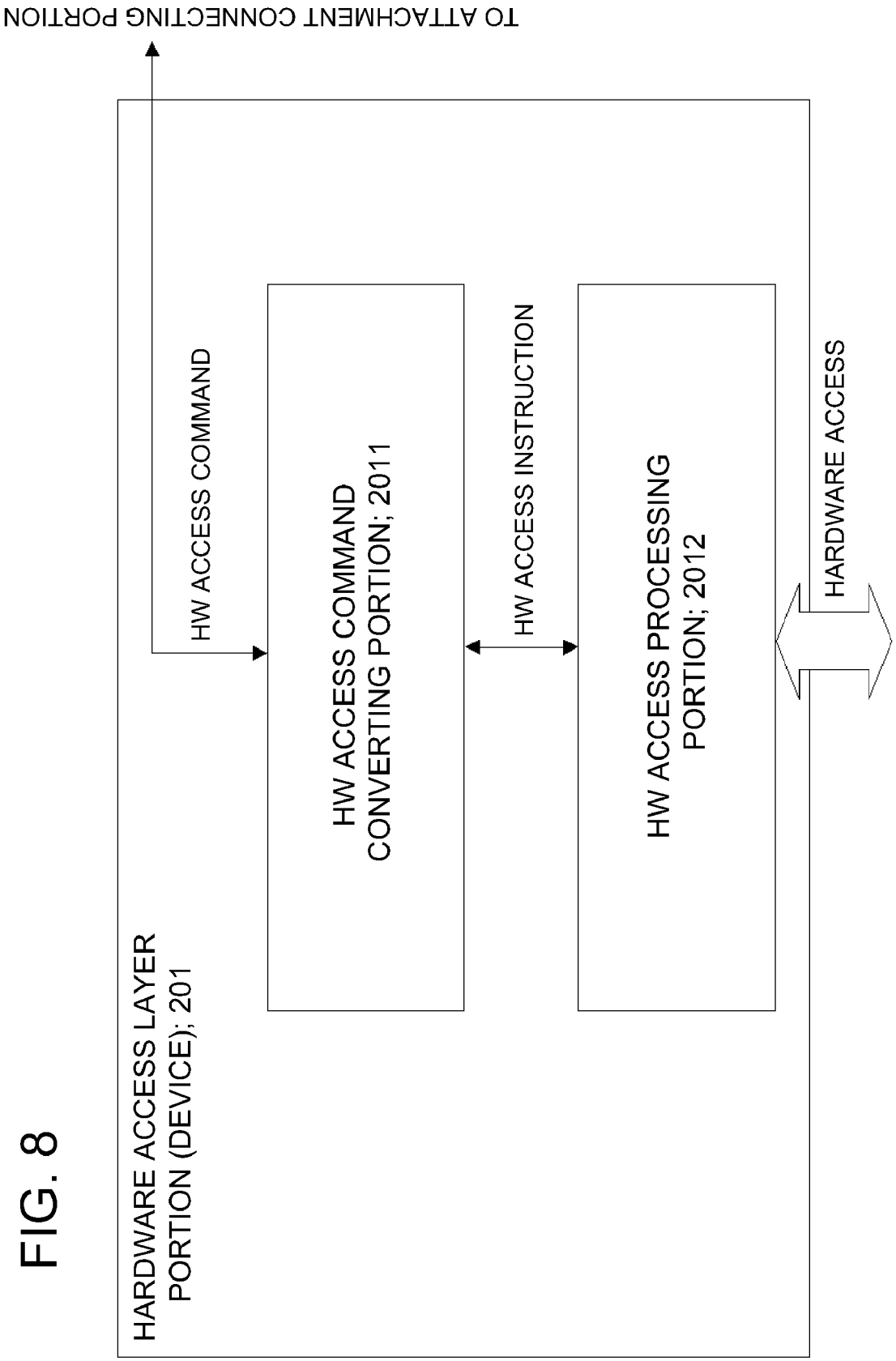
FIG. 8 is a block diagram showing a detailed configuration of a hardware access layer portion (device) of the attachment device according to the first exemplary embodiment of the present invention.

FIG. 8 is a block diagram showing a detailed configuration of the hardware access layer portion (device) 201 of the attachment device 20. In FIG. 8, the hardware access layer portion (device) 201 of the attachment device 20 is connected to the attachment connecting portion 202, and is constituted by an HW access command converting portion 2011 that receives the hardware access command and a hardware access processing portion 2012 that controls the attachment device 20.

The HW access command converting portion 2011 constructs the hardware access instructions from the hardware access command and transmits them to the hardware access processing portion 2012.

The hardware access processing portion 2012 performs hardware access based on the hardware access instructions received from the HW access command converting portion 2011.

Figure 9:
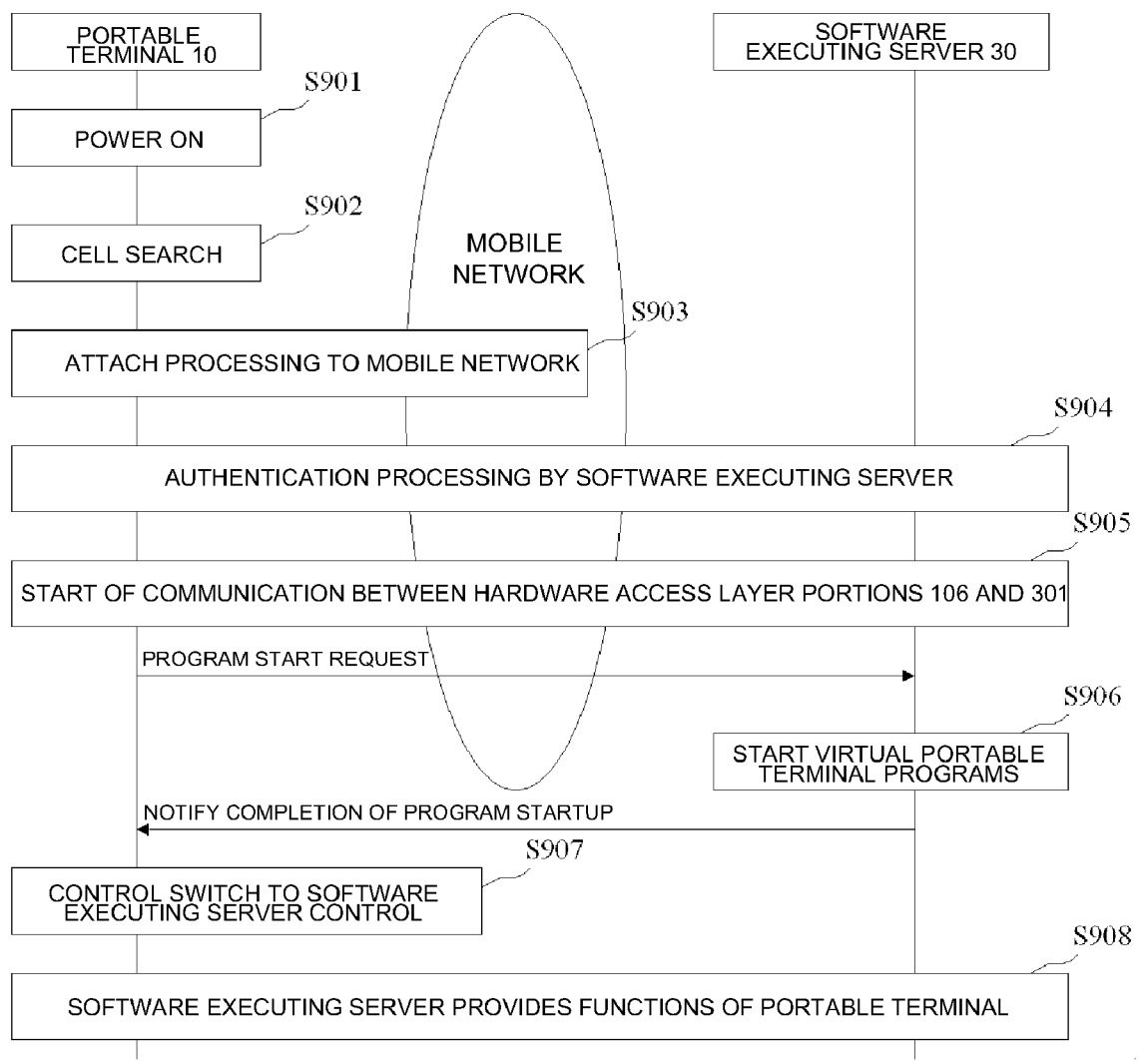
FIG. 9 is a flowchart showing steps from power-turning on the portable terminal according to the first exemplary embodiment of the present invention to completing the control switching, i.e., a series of virtual portable terminal programs has been started on the software executing server.

Next, the operation of the present exemplary embodiment will be described. FIG. 9 is a flowchart showing steps from turning on the portable terminal to completing the control-switching, i.e., a series of the virtual portable terminal programs has been started.

First, when the user turns on the portable terminal 10 (step S901), the cell search application 102 of the portable terminal 10 is started and a cell search request is made to the radio communication modem portion 104. The radio communication modem portion 104 searches for a nearest cell (step S902).

When a cell is found, the radio communication modem portion 104 performs attach processing to the mobile network and registers the portable terminal 10 to the mobile network (step S903).

Then, the authentication application 101 is started, and the authentication processing of the portable terminal 10 for the software executing server 30 is performed using the radio communication modem portion 104 via the mobile network (step S904).

When the authentication processing by the authentication application 101 is successful, the hardware access layer portion (device) 106 of the portable terminal 10 starts to communicate with the hardware access layer portion (virtual device) 301 of the software executing server 30 using the radio communication modem portion 104 via the mobile network (step S905).

Once the communication between the hardware access layer portions 106 and 301 has started, the hardware access layer portion (device) 106 of the portable terminal 10 transmits a request to the hardware access layer portion (virtual device) 301 of the software executing server 30 to start a group of the virtual portable terminal programs for realizing the virtual portable terminal.

The hardware access layer portion (virtual device) 301 of the software executing server 30, which has received the start request, performs startup processing of the virtual portable terminal programs (step S906).

When the startup processing is completed, the hardware access layer portion (virtual device) 301 of the software executing server 30 transmits a notification that the startup is completed to the hardware access layer portion (device) 106 of the portable terminal. The hardware access layer portion (device) 106 of the portable terminal, which has received the startup completion notification, hands over (i.e., switches) the control of the portable terminal 10 to the virtual portable terminal programs of the software executing server 30 (step S907).

From this point on, the functions of the portable terminal 10 are provided by the virtual portable terminal programs of the software executing server 30 (step S908).

As described, the portable terminal 10 switches its control to the virtual portable terminal programs of the software executing server 30 as long as the portable terminal can connect to the software executing server. In other words, according to this configuration, the portable terminal does not need advanced processing ability or memory resources, and cost and power consumption can be reduced.

Figure 10:
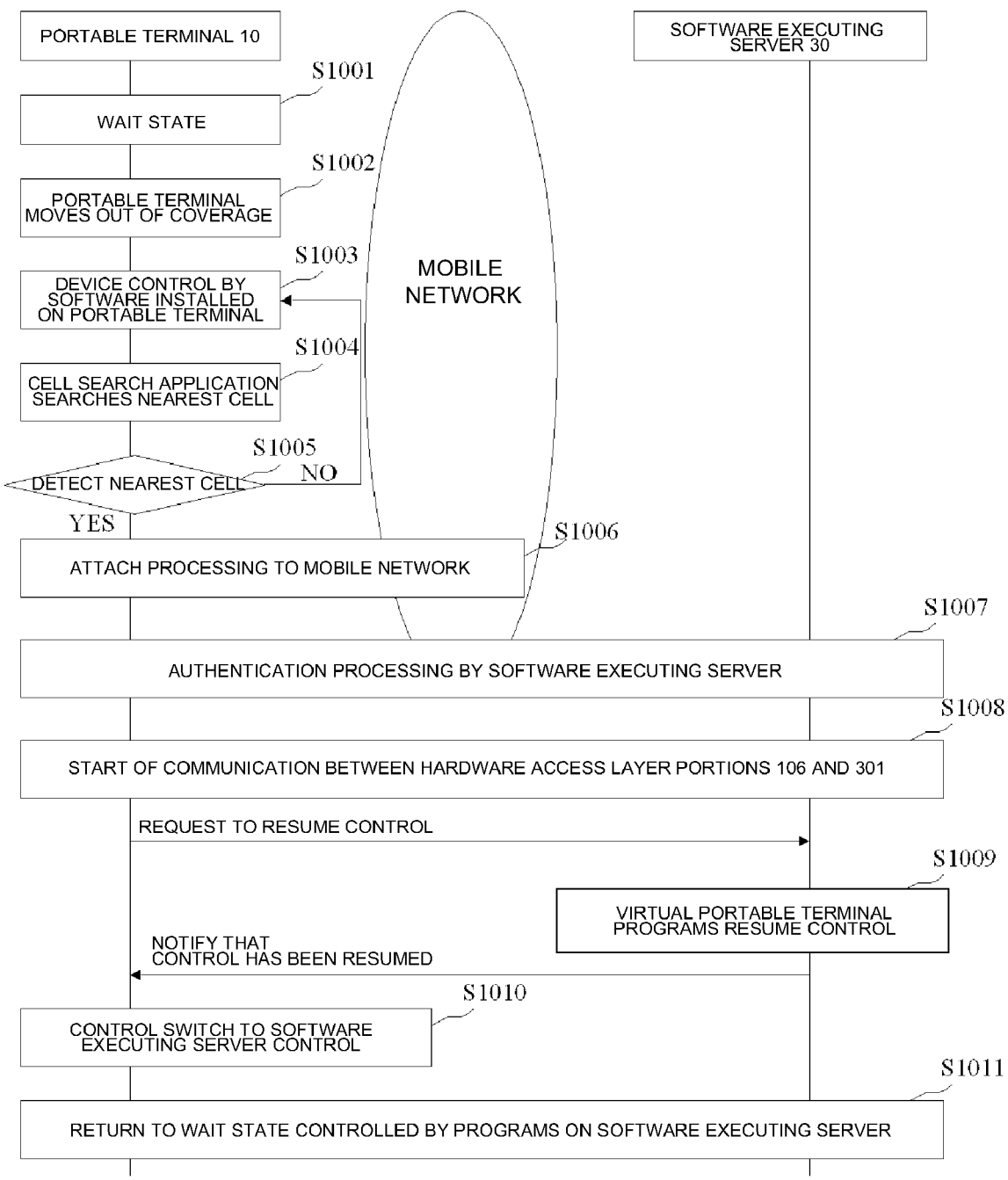
FIG. 10 is a flowchart showing the operation of the portable terminal according to the first exemplary embodiment of the present invention when the portable terminal has moved out of coverage while in a wait state provided by the software executing server.

FIG. 10 is a flowchart showing the operation of the portable terminal when the software executing server 30 is no longer able to provide the terminal functions because the portable terminal has moved (step S1002) while in a state in which the software executing server 30 is providing the terminal functions to the portable terminal (step S1001).

The portable terminal 10 shifts to a wait state in which the substitute program such as the simple OS 103 installed on the portable terminal takes control of the device (step S1003)

when the software executing server 30 is no longer able to provide the terminal functions to the portable terminal.

Then, the search for the nearest cell (neighboring) is performed by the cell search application at a predetermined time interval (step S1004). When a nearest cell is detected (YES in step S1005), the attach processing to the mobile network is performed (step S1006).

From this point on, as in the steps S904 to S908 in FIG. 9, after going through the authentication processing with the software executing server 30 (step S1007), the start of the communication between the hardware access layers (step S1008), the resuming of the virtual portable terminal program control (step S1009), and the switch of the control of the portable terminal 10 (step S1010), the portable terminal returns to the wait (stand-by) state controlled by the software executing server 30.

Figure 11:
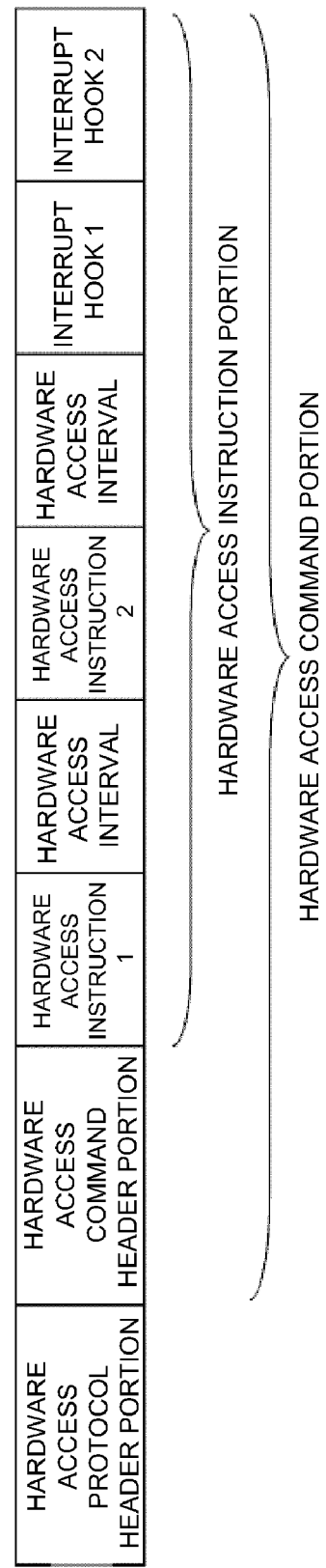
FIG. 11 is a drawing showing the structure of a hardware access protocol message according to the first exemplary embodiment of the present invention.

FIG. 11 is a drawing showing the structure of the hardware access protocol message transmitted between the portable terminal 10 and the software executing server 30. In FIG. 11, the hardware access protocol message is formed of a header portion and a hardware access command portion. The hardware access command portion is formed of a header portion and a hardware access instruction portion.

The hardware access instruction portion is able to contain the hardware access instruction such as write/read to/from a hardware address, the hardware access interval for taking time interval between hardware accesses, and the interrupt hook for having the software hook an interrupt from the hardware.

Figure 12:
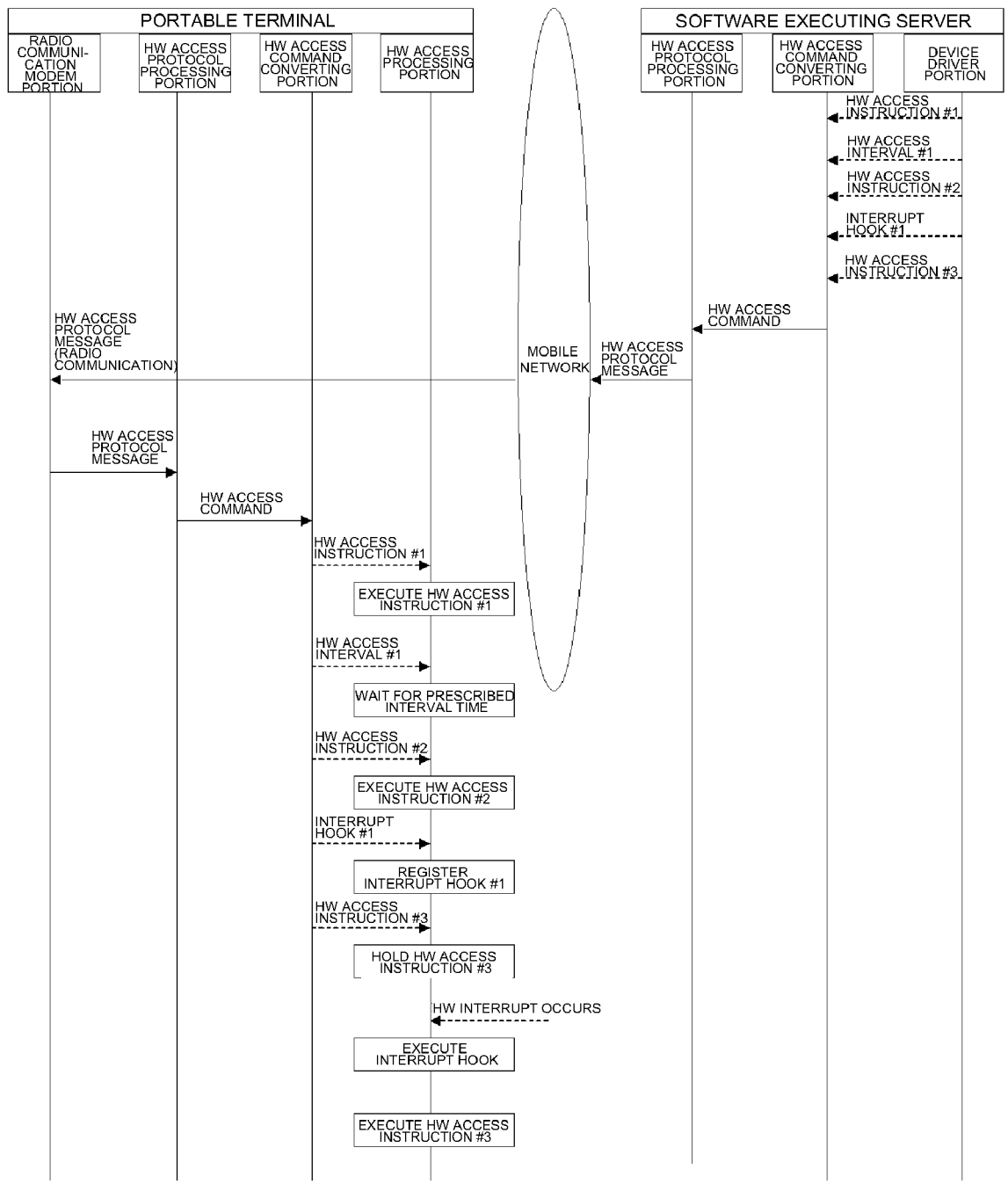
FIG. 12 is a flowchart showing how the hardware of the portable terminal is controlled by hardware access instructions issued by the software executing server according to the first exemplary embodiment of the present invention.

FIG. 12 is a flowchart showing how the hardware of the portable terminal 10 is controlled by the hardware access instructions issued by the software executing server 30 of the first exemplary embodiment of the present invention. In FIG. 12, when a device access occurs while the software executing server 30 is executing a software program, the device driver portion 302 issues the hardware access instruction, the hardware access interval, and the interrupt hook to the hardware access layer portion (virtual device) 301 based on the contents of a device control request received from the high-order blocks.

In the hardware (HW) access layer portion (virtual device) 301, the HW access command converting portion 3011 receives the hardware access instruction, the hardware access interval, and the interrupt hook.

The HW access command converting portion 3011 packs the hardware access instruction, the hardware access interval, and the interrupt hook into a hardware access command, to generate the hardware access command, and transmits it to the HW access protocol processing portion 3012.

The HW access protocol processing portion 3012 transmits the hardware access command to the portable terminal 10 using the hardware access protocol via the mobile network.

The radio communication modem portion 104 of the portable terminal, which has received the hardware access protocol message from the mobile network via radio communication, transmits the hardware access protocol message received to the hardware access layer portion (device) 106.

In the hardware access layer portion (device) 106, the HW access protocol processing portion 1061 receives the hardware access protocol message.

The HW access protocol processing portion 1061 extracts the hardware access command from the hardware access protocol message received and transmits it to the HW access command converting portion 1062.

The HW access command converting portion 1062 analyzes the hardware access command, acquires the hardware access instruction, the hardware access interval, and the interrupt hook, and successively transmits them to the hardware access processing portion 1063.

The hardware access processing portion 1063 performs hardware access according to the hardware access instruction, the hardware access interval, and the interrupt hook that it has received.

For instance, in the exemplary embodiment shown in FIG. 12, first hardware access instruction #1 is executed, and then hardware access instruction #2 is executed after a wait time period prescribed in hardware access interval #1, following the order in which these instructions are contained in the hardware access command.

Further, interrupt hook #1 is registered and hardware access instruction #3 is held. Then, when a hardware interrupt occurs, the interrupt is hooked and the hardware access instruction #3 is executed.

As described, the software executing server 30, operating as the virtual portable terminal, controls the hardware of the portable terminal via the mobile network.

Further, the fact that the hardware access instruction, the hardware access interval, and the interrupt hook are transmitted together in the form of the hardware access command/the hardware access protocol message shown in FIG. 11 solves the delay of hardware access caused by the delay in the mobile network.

Figure 13:
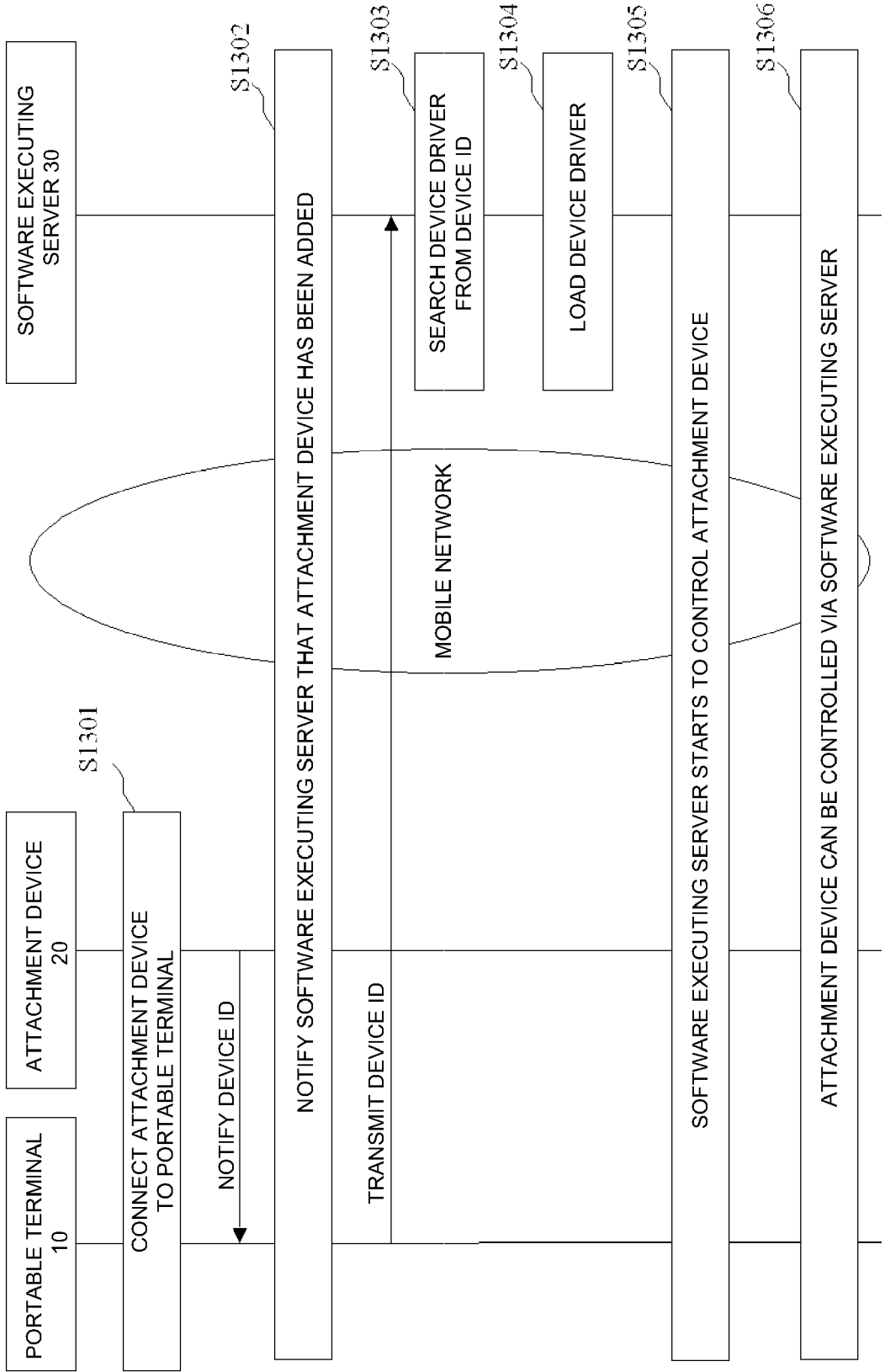
FIG. 13 is a drawing showing a series of operations performed when the attachment device is connected to the portable terminal according to the first exemplary embodiment of the present invention.

FIG. 13 is a drawing showing a series of operations performed when the attachment device 20 is connected to the portable terminal 10.

First, when the user connects the attachment device 20 to the portable terminal 10, the attachment device 20 reports an device ID (step S1301).

The portable terminal 10 notifies the software executing server 30 that the attachment device 20 is added and transmits the device ID (step S1302) to the server.

The software executing server 30 searches for a device driver corresponding to the device ID (step S1303), loads it, and adds it to the software environment of the portable terminal (step S1304).

Then the software executing server 30 starts to control the attachment device 20 (step S1305), and from this point on, it is possible for the virtual portable terminal program to control the attachment device 20 (step S1306).

Figure 14:
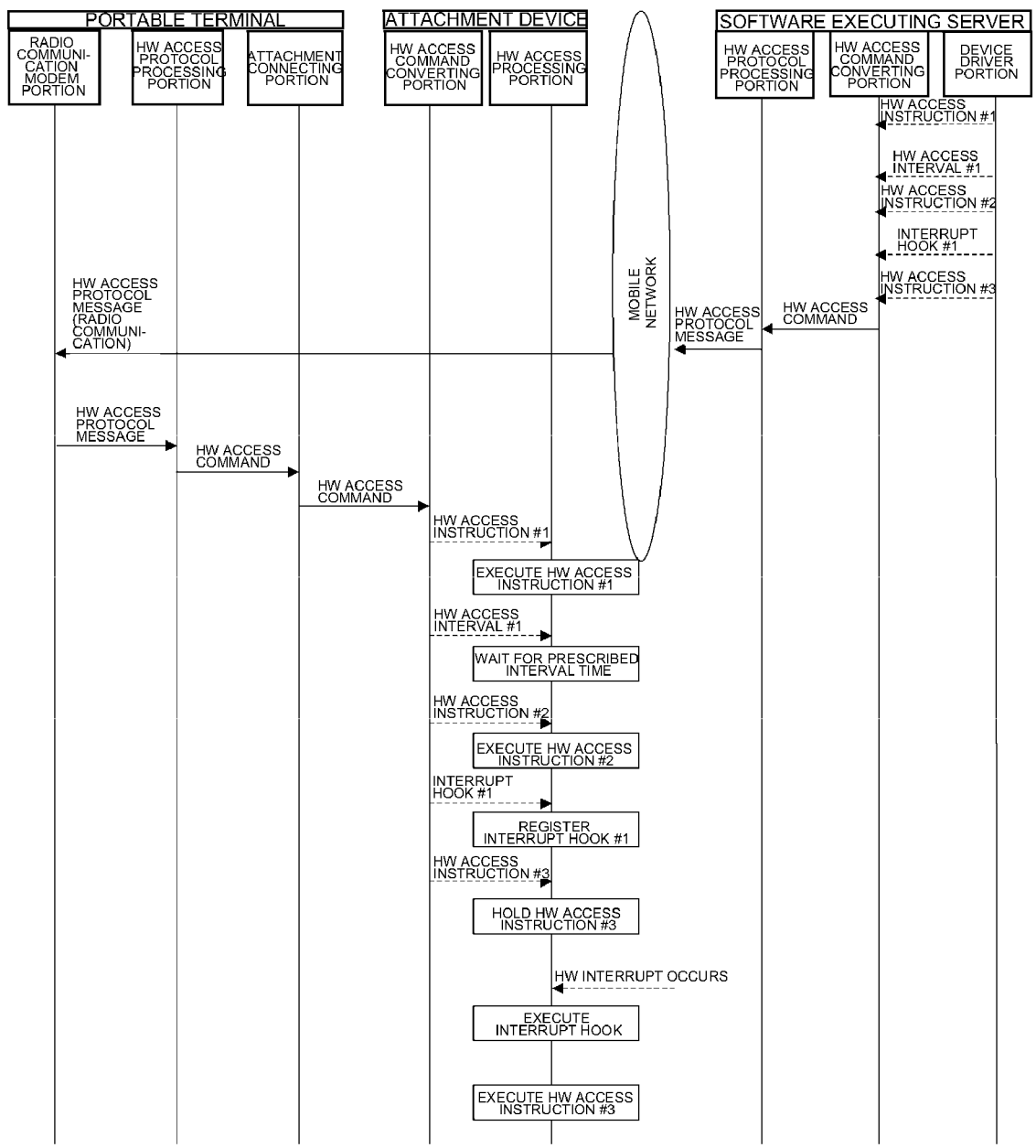
FIG. 14 is a flowchart showing how the attachment device connected to the portable terminal is controlled by the hardware access instructions issued by the software executing server according to the first exemplary embodiment of the present invention.

FIG. 14 is a flowchart showing how the attachment device 20 is controlled by the hardware access instructions issued by the software executing server 30, which now controls the attachment device 20 as described above. In FIG. 14, when the need to control the attachment device 20 occurs while the software executing server 30 is executing a virtual portable terminal program, the device driver portion 302 successively issues the hardware access instruction, the hardware access interval, and the interrupt hook to the hardware access layer portion (virtual device) 301 based on the contents of a device control request received from the high-order blocks.

In the hardware access layer portion (virtual device) 301, the HW access command converting portion 3011 receives the hardware access instruction, the hardware access interval, and the interrupt hook.

The HW access command converting portion 3011 packs the hardware access instruction, the hardware access interval, and the interrupt hook into a hardware access command, to generate the hardware access command, and transmits it to the HW access protocol processing portion 3012.

The HW access protocol processing portion 3012 transmits the hardware access command to the portable terminal 10 using the hardware access protocol via the mobile network.

The radio communication modem portion 104 of the portable terminal, which has received the hardware access protocol message from the mobile network via radio communication, transmits the hardware access protocol message received to the hardware access layer portion (device) 106.

In the hardware access layer portion (device) 106, the HW access protocol processing portion 1061 receives the hardware access protocol message.

The HW access protocol processing portion 1061 extracts the hardware access command from the hardware access protocol message received and transmits it to the attachment connecting portion 107/202.

The HW access command converting portion 2011 of the attachment device 20, which has received the hardware access command via the attachment connecting portion 107/202, analyzes the hardware access command, acquires the hardware access instruction, the hardware access interval, and the interrupt hook, and successively transmits them to the hardware access processing portion 2012.

The hardware access processing portion 2012 of the attachment device 20 performs hardware access according to the hardware access instruction, the hardware access interval, and the interrupt hook that it has received.

As described, the software executing server 30, operating as the virtual portable terminal, controls the hardware of the attachment device 20 connected to the portable terminal 10.

As described, it becomes possible to control not only the portable terminal 10 proper, but also a device attached to the portable terminal 10 such as the attachment device 20. Moreover, the device driver for the attachment device 20 does not have to be installed on the portable terminal 10, and the driver provided on the software executing server 30 can be used.

Only applications necessary for the hardware access processing such as the cell search application and the authentication application are installed on the portable terminal, and it is possible to control the hardware of the portable terminal 10 and the attachment device 20 connected to it using programs provided on the software executing server 30.

Therefore, it is not necessary to preinstall the OS and a series of application programs on the portable terminal 10 anymore, and the portable terminal 10 can utilize the resources of the software executing server 30, which provides the functions of the portable terminal, according to its needs. Further, as a result, it is possible to reduce the processing ability and memory resources required for the portable terminal 10. Furthermore, if the user environment of each user is registered on the software executing server 30 and can be read at the time of the authentication processing, it will be easy to maintain the previous user environment when the user of the portable terminal 10 is changed or the portable terminal 10 is replaced.

Further, the configuration described above has another advantage that wireless (radio) communication resources are not needed when data on a website on the Internet is downloaded to the software executing server or other storages on the network. For instance, without paying for radio packet, audio and video data can be collected. Radio resources are required when the audio and video data are played back on the portable terminal 10, however, it is enough that a buffer for holding necessary commands and data be provided on the portable terminal 10.

EXEMPLARY EMBODIMENT 2

Next, a second exemplary embodiment in which it is possible to control an external device, not connected to the portable terminal 10, will be described. Since the present exemplary embodiment has basically the same configuration as Exemplary embodiment 1 described above, the differences between them will mainly be discussed.

Figure 15:
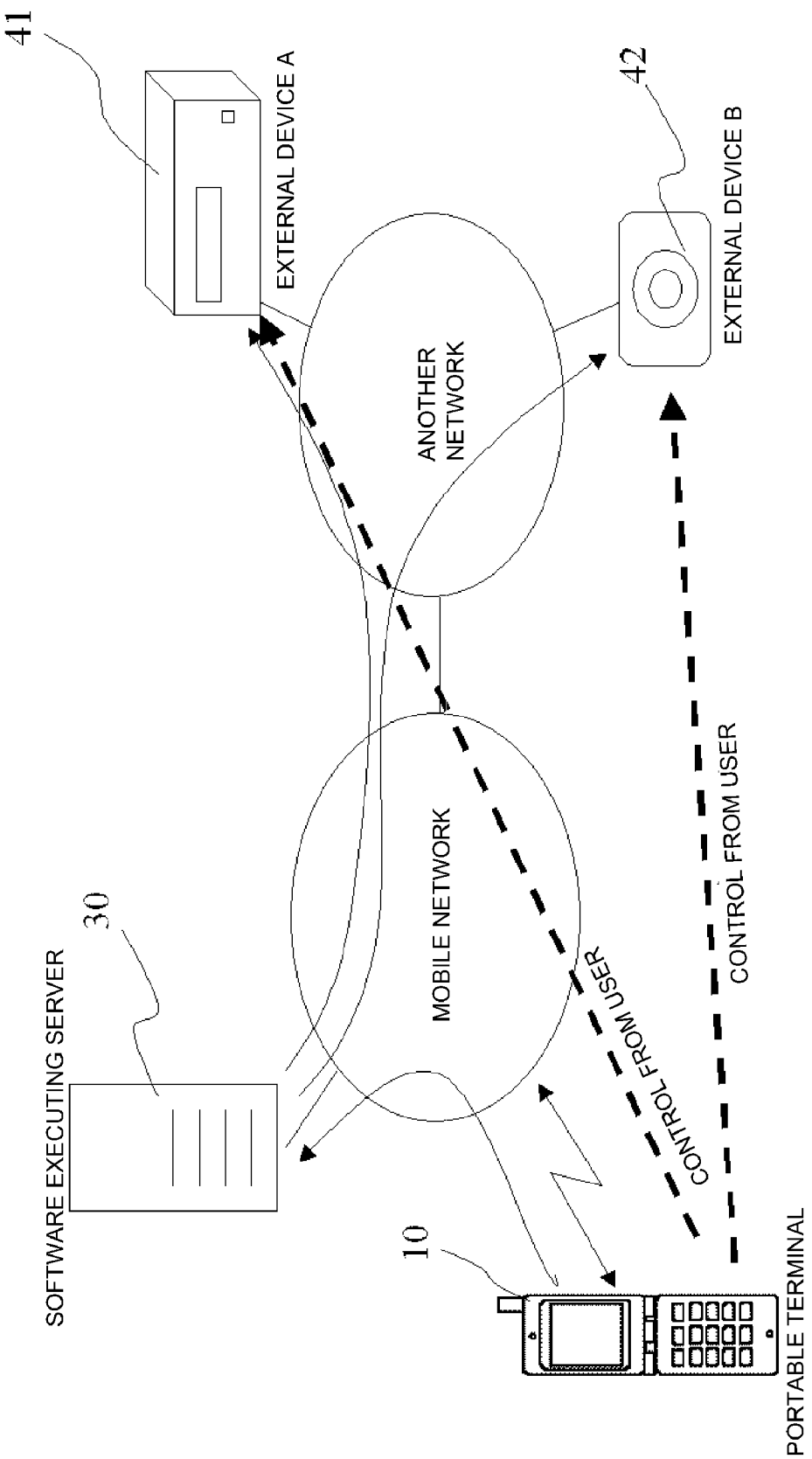
FIG. 15 is a drawing for explaining a schematic configuration and the operation of a second exemplary embodiment of the present invention.

FIG. 15 is a drawing for explaining a schematic configuration and the operation of the second exemplary embodiment of the present invention. FIG. 15 shows the portable terminal 10 having access means to a mobile network, the mobile network, the software executing server 30 connected to the mobile network, another network connected to the mobile network, and external devices A41 and B42 connected to the network.

The external devices A41 and B42 are any devices having an interface capable of receiving the hardware access protocol transmitted by the software executing server 30. For instance, various network-ready devices such as cameras set up at homes or offices, biological information input devices, and electric household appliances having a communication function may be used. A method for controlling these external devices A41 and B42 from the portable terminal 10 via the software executing server 30 will be described.

Figure 16:
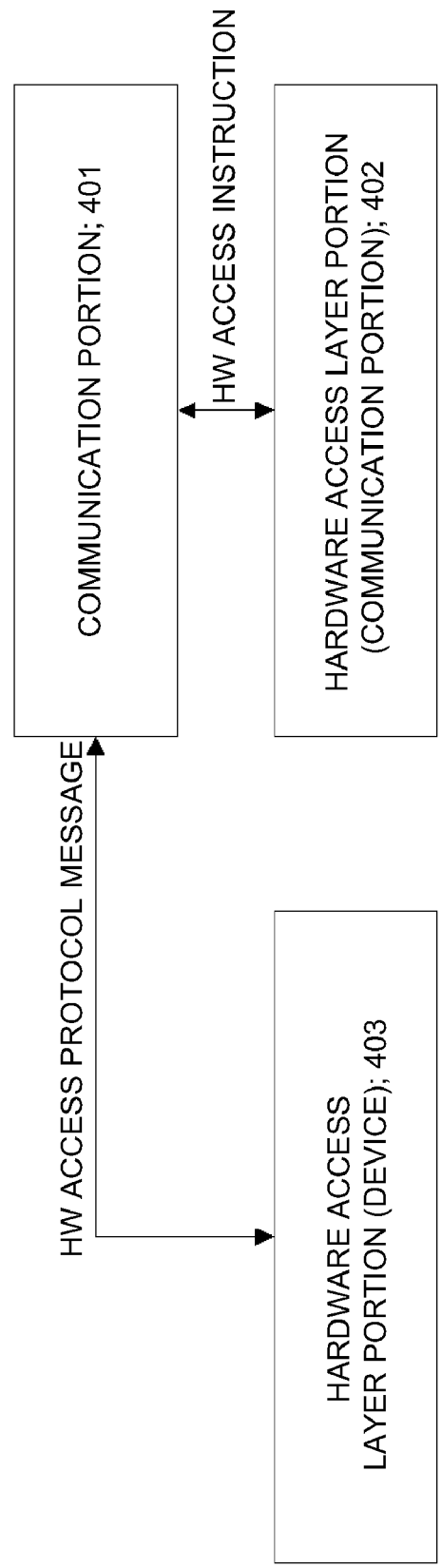
FIG. 16 is a block diagram showing the software structure of an external device according to the second exemplary embodiment of the present invention.

FIG. 16 is a block diagram showing the software structure of the external device A41 (the external device B42 has the same structure). In FIG. 16, the external device A41 comprises a communication portion 401, a hardware access layer portion (communication portion) 402, and a hardware access layer portion (device) 403.

The communication portion 401 provides functions of connecting to the network and of communicating with it for the external device.

Further, the hardware access layer portion (communication portion) 402 provides access means to communication-related hardware.

The hardware access layer portion (device) 403 provides access means to non-communication-related hardware for the high-order blocks. Further, the hardware access layer portion (device) 403 has the function of communicating with the hardware access layer portion (virtual device) 301 of the software executing server 30 using the hardware access protocol, and the function of executing the hardware access command.

The internal structure of the hardware access layer portion (device) 403 is the same as that of the hardware access layer portion (device) 106 of the portable terminal 10 (refer to FIG. 4).

Next, the operation of the present exemplary embodiment will be described. When the need to control the external device A41 (or the external device B42) occurs on a software program on software executing server 30, the device driver portion 302 receives a device control request from the high-order blocks.

The device driver portion 302 issues the hardware access instruction and the others to the hardware access layer portion (virtual device) 301 based on the contents of the device control request, as in the first exemplary embodiment.

In the hardware access layer portion (virtual device) 301, the HW access command converting portion 3011 receives the hardware access instruction and the others.

The HW access command converting portion 3011 packs the hardware access instruction and the others into a hardware access command, to generate the hardware access command, and transmits it to the HW access protocol processing portion 3012.

The HW access protocol processing portion 3012 transmits the hardware access command to the external device A41 (or the external device B42) using the hardware access protocol via the external network.

In the external device A41 (or the external device B42), the communication portion 401 receives the hardware access protocol message via the network.

The communication portion 401 transmits the hardware access protocol message received to the hardware access layer portion (device) 403.

The operation in the hardware access layer portion (device) 403 is the same as that of the attachment device in the first exemplary embodiment (refer to FIG. 14).

As described, the software executing server 30, operating as the virtual portable terminal, is able to control the external device A41 (or the external device B42) on another network. Further, since the processing is completed by the software executing server 30 and the external device A41 (or the external device B42) and only the results of it is sent to the portable terminal 10 in the present configuration, it becomes easy to perform processing too large for the portable terminal 10 such as authentication processing of an image supplied by the external device A41 or of biological information.

The fact that the external device A41 (or the external device B42), unconnected to the portable terminal 10, can be directly controlled by the portable terminal 10 via the software executing server 30 means that only the hardware access layers need to be provided for the external device A41 (or the external device B42) and that it is not necessary to provide a dedicated user interface and display device for the external device.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

Figure 17:
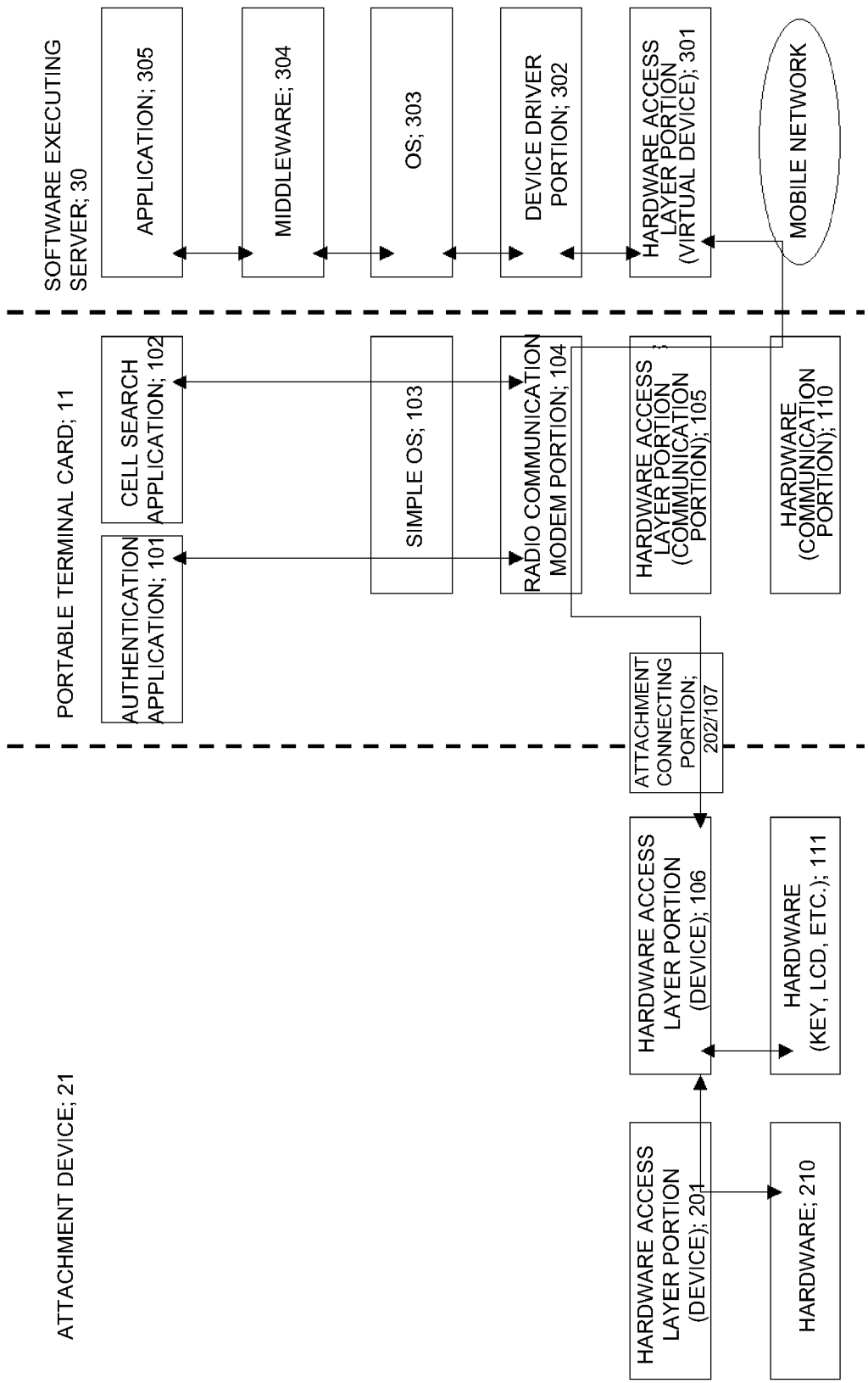
FIG. 17 is a drawing showing an attachment device, a portable terminal, and a software executing server relating to another mode of the present invention in a hierarchical model.

For instance, in the modes and the exemplary embodiments described above, the portable terminal 10 comprises the non-communication-related hardware 111 and hardware access layer portion 106 (refer to FIG. 2), however, the portable terminal 10 only needs to have the functions of connecting to the software executing server 30 and of receiving the hardware access command. For instance, as shown in FIG. 17, it is possible to employ a configuration in which a card-shaped portable terminal module (portable terminal card) 11 and an attachment device 21, in which necessary keys, an LCD, and memory are disposed, are connected. In this configuration, the processing ability and memory resources of the portable terminal module (portable terminal card) 11 can be minimized and cost, size, and power consumption can be further reduced.

What is claimed is:

1. A portable terminal, said portable terminal accessing a software executing server having a hardware access layer in which the hardware of a predetermined portable terminal is virtualized, wherein said server executes a virtual portable terminal program realizing a predetermined function of said portable terminal in response to a request from said portable terminal, said portable terminal comprising:

a hardware processor; and a terminal-end hardware access layer that receives a hardware access instruction, issued by said virtual portable terminal program to said hardware access layer of said software executing server, in a hardware access command containing the hardware access instruction, a plurality of other hardware access instructions, a hardware access interval, and an interrupt hook;

wherein said hardware access command is generated by said hardware access layer of said software executing server and transmitted over a network to said portable terminal;

wherein said hardware access instruction and said plurality of other hardware access instructions include at least one instruction to write to or read from a hardware address;

wherein said hardware access interval prescribes a wait time for said portable terminal to wait between executing hardware access instructions selected from the hardware access instruction and the plurality of other hardware access instructions; and wherein said interrupt hook prescribes which hardware access instruction, selected from the hardware access instruction and the plurality of other hardware access instructions, should be executed when a hardware interrupt occurs and is hooked on said portable terminal.

2. The portable terminal as defined in claim 1, wherein a substitute program on said portable terminal is started when said portable terminal cannot access said software executing server; and said substitute program on said portable terminal is ended as soon as access to said software executing server has been restored, and requesting to start said virtual portable terminal program is made to said software executing server.

3. The portable terminal as defined in claim 1, wherein said portable terminal notifies said software executing server of an attachment device connected to said portable terminal, thereby having said hardware access layer of said software executing server updated;

wherein a hardware access command for said attachment device is received via said updated hardware access layer; and control of said attachment device is executed.

4. The portable terminal as defined in claim 1, wherein said portable terminal is capable of controlling an external device connected to said software executing server by having a hardware access instruction for said external device issued via a virtual portable terminal program executed on said software executing server.

5. A software executing server, said software executing server comprising a hardware processor and a hardware access layer in which the hardware of a predetermined portable terminal is virtualized, wherein said server executes a virtual portable terminal program realizing a predetermined function of a portable terminal in response to a request from said portable terminal;

said portable terminal comprising a terminal-end hardware access layer that receives a hardware access instruction, issued by said virtual portable terminal program to said hardware access layer of said software executing server, in a hardware access command containing the hardware access instruction, a plurality of other hardware access instructions, a hardware access interval, and an interrupt hook;

wherein said hardware access command is generated by said hardware access layer of said software executing server and transmitted over a network to said portable terminal;

wherein said hardware access instruction and said plurality of other hardware access instructions include at least one instruction to write to or read from a hardware address;

wherein said hardware access interval prescribes a wait time for said portable terminal to wait between executing hardware access instructions selected from the hardware access instruction and the plurality of other hardware access instructions; and wherein said interrupt hook prescribes which hardware access instruction, selected from the hardware access instruction and the plurality of other hardware access instructions, should be executed when a hardware interrupt occurs and is hooked on said portable terminal.

6. The software executing server defined in claim 5, wherein said software executing server updates said hardware access layer of said software executing server based on a notification from said portable terminal that an attachment device has been connected to said portable terminal, and executes control of an attachment device via said portable terminal by issuing a hardware access instruction to said updated hardware access layer.

7. The software executing server as defined claim 5, wherein said server executes control of an external device connected by a network by issuing a hardware access instruction for said external device based on a control request for said external device received via said virtual portable terminal program.

8. A method for realizing a function of a portable terminal, in a portable terminal accessing a software executing server, having a hardware access layer in which the hardware of a predetermined portable terminal is virtualized, wherein said server executes a virtual portable terminal program realizing a predetermined function of said portable terminal in response to a request from said portable terminal, the method comprising:

said portable terminal accessing said software executing server and requesting starting of said virtual portable terminal program;

said virtual portable terminal program executed by said software executing server issuing a hardware access instruction to said hardware access layer of said software executing server after said software executing server has started said virtual portable terminal program requested by said portable terminal;

said software executing server transmitting said hardware access instruction as a hardware access command capable of containing the hardware access instruction, a plurality of other hardware access instructions, a hardware access interval, and an interrupt hook to said portable terminal; and said portable terminal operating hardware according to a hardware access instruction contained in said hardware access command;

wherein said hardware access command is generated by said hardware access layer of said software executing server and transmitted over a network to said portable terminal;

wherein said hardware access instruction and said plurality of other hardware access instructions include at least one instruction to write to or read from a hardware address;

wherein said hardware access interval prescribes a wait time for said portable terminal to wait between executing hardware access instructions selected from the hardware access instruction and the plurality of other hardware access instructions; and wherein said interrupt hook prescribes which hardware access instruction, selected from the hardware access instruction and the plurality of other hardware access instructions, should be executed when a hardware interrupt occurs and is hooked on said portable terminal.

9. The method for realizing a function of a portable terminal as defined in claim 8, further comprising:

having said portable terminal detect that said portable terminal cannot access to said software executing server and start an substitute program on said portable terminal; and having said portable terminal detect that the access to said software executing server has been restored, end said substitute program, and request said software executing server to start said virtual portable terminal program.

10. The method for realizing the function of a portable terminal as defined in claim 8, further comprising:

having said software executing server update said hardware access layer of said software executing server based on a notification from said portable terminal that an attachment device has been connected to said portable terminal; wherein said software executing server executes the control of an attachment device by issuing a hardware access instruction to said updated hardware access layer.

11. The method for realizing a function of a portable terminal as defined in claim 8, further comprising:

having said software executing server, via said virtual portable terminal program, receive a control request from said portable terminal that an external device connected by a network be controlled; and having said software executing server control said external device by issuing a hardware access instruction to said external device according to said control request.

* * * * *